(12) United States Patent
Darabi

(10) Patent No.: US 8,170,625 B2
(45) Date of Patent: *May 1, 2012

(54) BIAS FILTERING MODULE INCLUDING MOS CAPACITORS

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 12/165,332

(22) Filed: Jun. 30, 2008

(65) Prior Publication Data

US 2008/0267270 A1    Oct. 30, 2008

Related U.S. Application Data

(63) Continuation of application No. 11/183,446, filed on Jul. 18, 2005, now Pat. No. 7,395,098, which is a continuation of application No. 10/303,412, filed on Nov. 25, 2002, now Pat. No. 6,931,267.

(51) Int. Cl.
*H04B 1/38* (2006.01)
*H04N 1/00* (2006.01)

(52) U.S. Cl. ......... 455/574; 455/127.1; 455/307; 455/333; 455/343.1; 370/311

(58) Field of Classification Search ......... 455/127.1, 455/127.5, 232.1, 307, 333, 334, 339, 343.1, 455/343.3, 574; 370/311

See application file for complete search history.

(56) References Cited

U.S. PATENT DOCUMENTS

| | | | | |
|---|---|---|---|---|
| 5,666,355 | A * | 9/1997 | Huah et al. | 370/311 |
| 5,794,137 | A * | 8/1998 | Harte | 455/343.4 |
| 5,799,256 | A * | 8/1998 | Pombo et al. | 455/574 |
| 6,047,168 | A * | 4/2000 | Carlsson et al. | 455/127.1 |
| 6,078,825 | A * | 6/2000 | Hahn et al. | 455/569.2 |
| 6,154,642 | A * | 11/2000 | Dumont et al. | 455/574 |
| 6,463,050 | B1 * | 10/2002 | Nagashima | 370/311 |

* cited by examiner

*Primary Examiner* — Quochien B Vuong

(74) *Attorney, Agent, or Firm* — Garlick & Markison; Bruce E. Garlick

(57) ABSTRACT

A bias filtering module with at least two capacitive levels satisfies both a settle time requirement and a filtering requirement using a voltage dependent filter module whose capacitance is a function of a voltage potential on the filtering circuitry output terminal. The final capacitance level is approximately three times larger than the initial capacitance level. MOS capacitors having a voltage dependent charge capacity within the bias filtering module are coupled between a plurality of bias lines and circuit common. In an alternate embodiment, a selectable first group of capacitors are switched into connection within the bias filtering module as a second group of capacitors approximately reach a fully charged state within a specified settle time to provide improved filtering.

19 Claims, 8 Drawing Sheets

BIAS FILTERING MODULE INCLUDING MOS CAPACITORS

CROSS-REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 11/183,446, entitled "Bias Filtering Module Including MOS Capacitors," filed Jul. 18, 2005, pending.
   a. U.S. Utility application Ser. No. 11/183,446 claims priority pursuant to 35 U.S.C. §120, as a continuation to U.S. patent application Ser. No. 10/303,412, entitled "Bias Filtering Module Including MOS Capacitors," filed Nov. 25, 2002, now U.S. Pat. No. 6,931,267.

BACKGROUND OF THE INVENTION

1. Technical Field of the Invention

This invention relates generally to wireless communication systems and more particularly to radio frequency integrated circuits used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital amps, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

For each wireless communication device to participate in wireless communications, it either includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage converts raw data into baseband signals in accordance with a particular wireless communication standard. The one or more IF stages mix the baseband signals with one or more local oscillations to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies them. The one or more IF stages mix the amplified RF signals with one or more local oscillations to convert the amplified RF signal into baseband signals or IF signals. The filtering stage filters the baseband signals or the IF signals to attenuate unwanted out-of-band signals to produce filtered signals. The data recovery stage recovers raw data from the filtered signals in accordance with the particular wireless communication standard.

The need for wireless networking has been addressed by various standards bodies that promulgate inter-working standards. One such standards body promulgated the IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data. However, IEEE 802.11 networks lack high data rate and Quality of Service (QOS) features to support multimedia communications.

Wireless personal area networks (WPANs) enable short-range "ad-hoc" connectivity among portable consumer electronics and communication devices but do not require the infrastructure needed for an 802.11 network. The WPAN™ Study Group (SG) was formed on Mar. 12, 1998 by the IEEE 802.11 Working Group to investigate the need for a supplemental wireless network standard specifically targeted to provide very low power consumption, low complexity, wireless connectivity among devices within or entering a Personal Operating Space (POS). This includes devices that are carried, worn, or located near the body. These activities have led to the development of 802.15, which is a WPAN standard.

Another known WPAN is Bluetooth. For both Bluetooth and 802.15 WPANs, the coverage area for a WPAN is generally within a 10-meter radius. In other words, a personal operating space (POS) is the space about a person that typically extends up to 10 meters in all directions and envelops the person whether stationary or in motion. It is within the POS that the portable device communicates with an access point. The Bluetooth radio system has emerged as the first technology addressing WPAN applications with its salient features of low power consumption, small package size, and low cost. Raw data rates for Bluetooth devices are limited to 1 Mbps, although the actual throughput is about half of the raw data rate. A Bluetooth communication link supports up to three voice channels with very limited additional bandwidth for bursty data traffic. However, Bluetooth communication links cannot support the data transfer requirements of portable consumer electronics devices that transmit and receive multimedia data, e.g., high quality video applications, audio applications, and multi-megabyte file transfers for music and image files.

Additional limitations placed upon such devices relate to their cost and power consumption. Many devices operating in an ad-hoc network are battery powered. Thus, the power consumption requirements placed on the device by the integrated circuitry servicing its communications should be minimal. Further, the communication circuitry contained therein desirably should be high in performance but low in cost. Operationally stable, high data rate communication circuitry, e.g., RF front end circuitry, frequency/phase reference circuitry, etc., are relatively high in cost in terms of IC real estate. Thus, components that are highly stable cannot always be employed. Thus, selected components in a circuit often suffer from RF carrier frequency drift, symbol clock frequency drift, and other synchronization related problems. In order to support high data rate communications, these operational problems must be overcome. Thus, there is a need in the art for wireless communication circuit components that support high data rate communications, that consume little power, and that are relatively inexpensive to produce and operate.

Each of the various stages of the radio receiver, whether its part of Bluetooth or an 802.15 WPAN, an 802.11 wireless local area network, or a cellular radio network, consume differing amounts of power but often operate on battery power. Because it is desirable to extend battery life to a maximum amount, many different communication devices provide for a sleep mode in which a radio is powered down until activated by the depression of a key or the like. Moreover, some of the standards provide for powering down a receiver for a specified period of time or mode of operation and then powering the receiver back up to enable it to engage in communications. The standards generally specify a settle time requirement wherein powered down elements must reach an operational steady state within the specified settle time. The frequent power down and power up cycles, among other operations, can generate high frequency noise (transients of short duration and relatively high amplitude), however, as the digital and analog elements change state in response to a power management commands. The high frequency noise can be coupled to the biasing lines that provide power to all elements in the circuit. The biasing lines, therefore, require filtering to bypass this high frequency noise to circuit common.

Accordingly, a need exists for a bias filtering method and circuit that meets the fast settle time requirements of the power management mode of operation and also meets the biasing lines filter requirement.

BRIEF SUMMARY OF THE INVENTION

Active devices within a wireless radio transmitter, wireless radio receiver, or wireless transceiver are biased at a plurality of bias levels to satisfy a settle time specification and to provide improved filtering. To meet the specified settle time, bypass capacitors must be small enough to reach full charge within the specified settle time. A small capacitor that meets such settle time requirements usually will not always provide enough filtering on the bias lines to adequately bypass noise to circuit common. Accordingly, the invention includes circuitry that provides varying capacitance and corresponding charge levels to satisfy the settle time specification and provide the improved filtering.

A bias filtering module with at least two capacitive levels satisfies both the settle time specification and filtering requirement by including a voltage dependent filter module whose capacitance is a function of a voltage potential on the filtering circuitry output terminal. The final capacitance level is approximately three times larger than the initial capacitance level. MOS capacitors are coupled within the bias filtering module in one embodiment of the invention, and are coupled between a plurality of bias lines and circuit common. In another embodiment, a capacitor array is used to gradually add capacitance after a circuit has reached a steady state condition.

Logic circuitry coupled to at least one module of a plurality of modules is provided to power down at least a portion of the at least one module during a specified mode of operation to conserve power. The powered down portions are powered up whenever the logic circuitry detects a trigger event. Thus, the voltage dependent filter module reaches steady state within a required settle time whenever a powered down circuit or circuit portion is powered back up and then increases the charge capacity to improve filtering.

Other features and advantages of the present invention will become apparent from the following detailed description of the invention made with reference to the accompanying drawings.

DETAILED DESCRIPTION OF THE INVENTION

Figure 1:
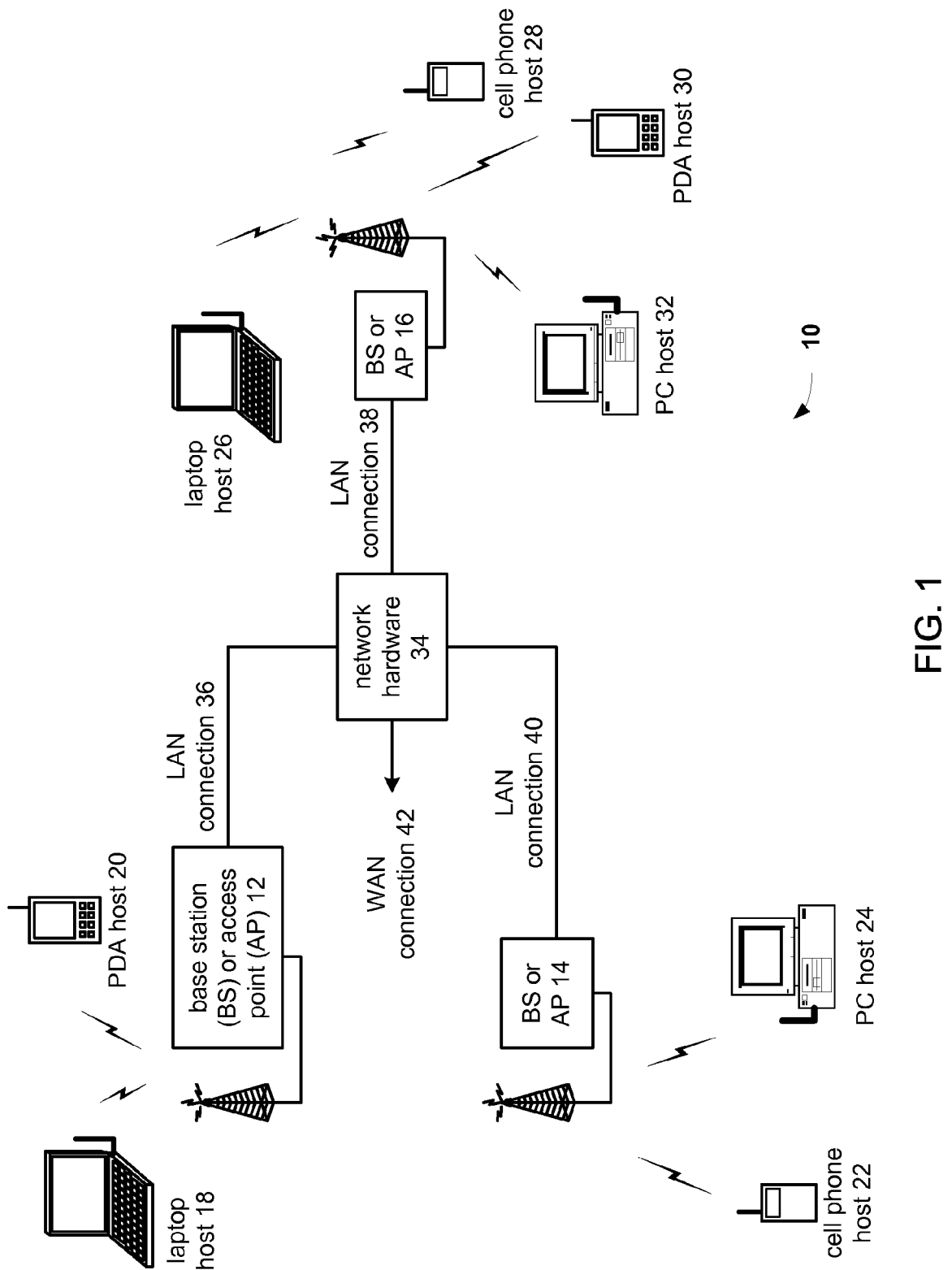
FIG. 1 is a schematic block diagram of a wireless communication system in accordance with the present invention.

FIG. 1 is a schematic block diagram illustrating a communication system 10 that includes a plurality of base stations or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a highly linear amplifier and/or programmable multi-stage amplifier, as disclosed herein, to enhance performance, reduce costs, reduce size, and/or enhance broadband applications.

Figure 2:
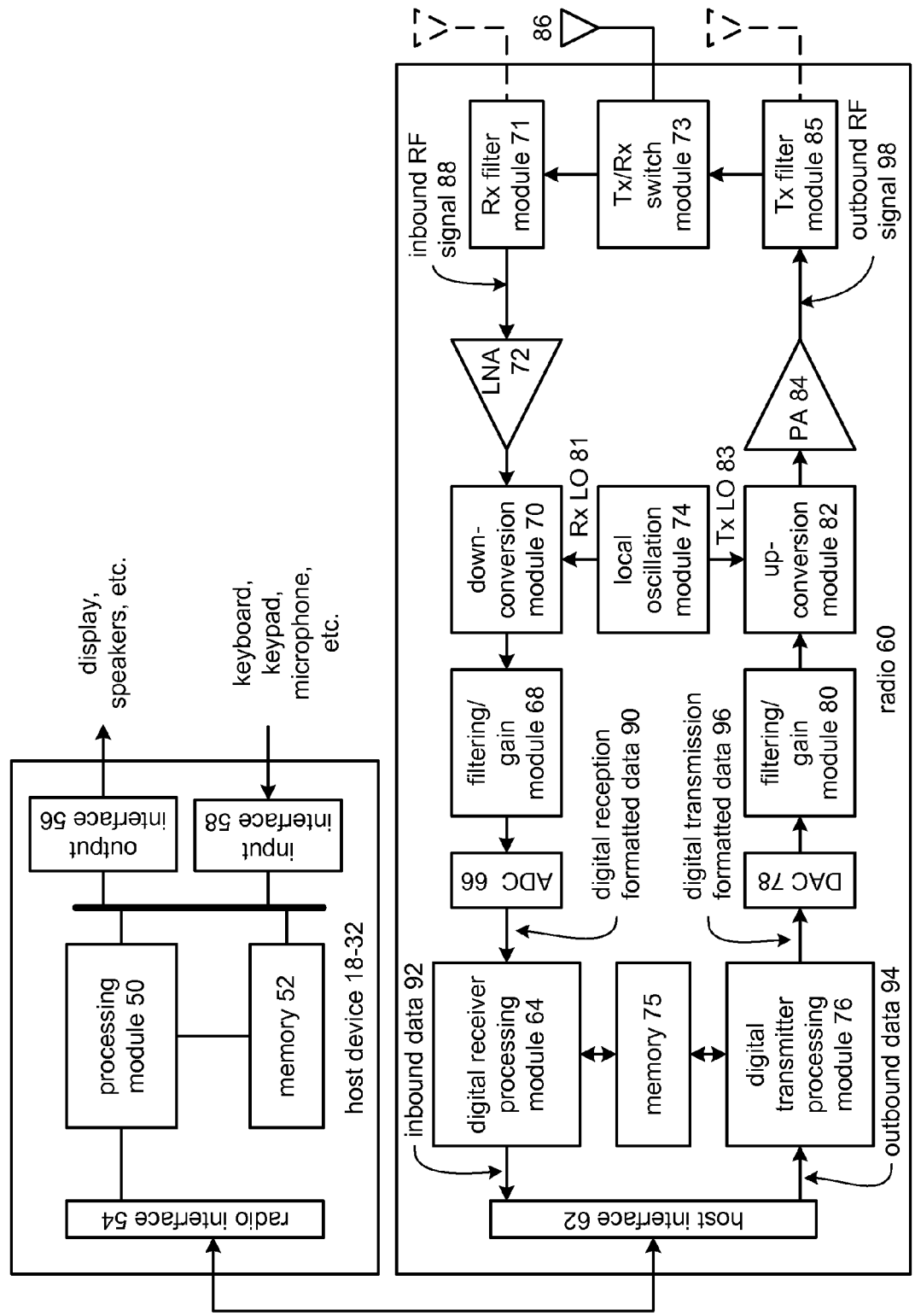
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processor module 50, a memory 52, a radio interface 54, an input interface 58 and an output interface 56. The processor module 50 and memory 52 execute the corresponding instructions that are typically done by the host device. For example, for a cellular telephone host device, the processor module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processor module 50 for further processing and/or routing to the output interface 56. The output interface 56 provides connectivity to an output display device, such as a display, monitor, speakers, etc., such that the received data may be displayed. The radio interface 54 also provides data from the processor module 50 to the radio 60. The processor module 50 may receive the outbound data from an input device such as a keyboard, keypad, microphone, etc., via the input interface 58 or generate the data itself. For data received via the input interface 58, the processor module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, an IF mixing down-conversion module 70, a receiver filter module 71, a low noise amplifier 72, a transmitter/receiver switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing up-conversion module 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74, which may be implemented in accordance with the teachings of the present invention. The IF mixing down-conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, while the digital receiver processing module 64, the digital transmitter processing module 76 and memory 75 may be implemented on a second integrated circuit. The remaining components of the radio 60, less the antenna 86, may be implemented on a third integrated circuit. As an alternate example, the radio 60 may be implemented on a single integrated circuit. As yet another example, the processor module 50 of the host device and the digital receiver and transmitter processing modules 64 and 76, respectively, may be a common processing device implemented on a single integrated circuit. Further, memory 52 and memory 75 may be implemented on a single integrated circuit and/or on the same integrated circuit as the common processing modules of processor module 50 and the digital receiver processing module 64 and digital transmitter processing module 76.

Some or all of the radios 60 of FIG. 1 include radio receiver elements selectively powered down and powered up according to a plurality of different modes of operation and also include bias filtering modules that provide voltage dependent biasing characteristics to satisfy settle time requirements and to provide improved filtering of the bias lines as is described in greater detail with reference to the figures that follow.

Figure 3:
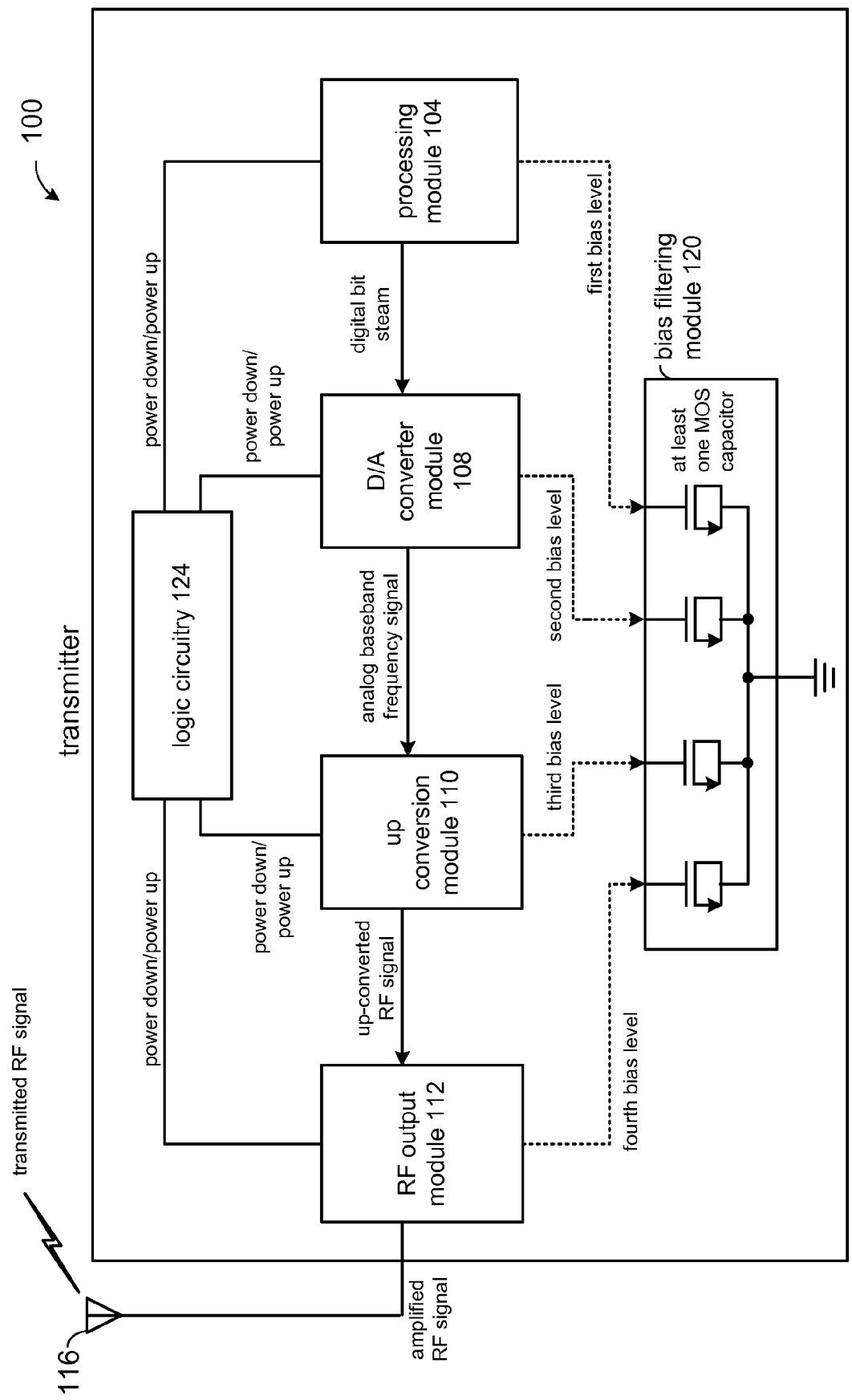
FIG. 3 is a schematic block diagram of a wireless transmitter with the inventive bias filtering module.

FIG. 3 is schematic block diagram of a wireless transmitter, shown generally at 100, illustrating one embodiment of the present invention. A digital bit stream is generated by processing module 104. The digital bit stream is coupled to D/A converter 108 to convert the digital bit stream from the digital domain to the analog domain and thus provide an analog baseband frequency signal to up-conversion module 110 that produces an up-converted RF signal. Up-conversion module 110 comprises elements such mixers, amplifiers, and local oscillators (LO), and filtering/gain circuitry for up-converting the analog baseband frequency signal to an RF signal using techniques know to one of average skill in the art. The up-converted RF signal is operably produced to RF output module 112. RF output module 112 comprises a plurality of components, such as transmit filters and power amplifiers for amplifying the up-converted RF signal for transmission via antenna 116.

Every element in transmitter 100 requires biasing for proper operation and is biased to one of a plurality of bias levels. The bias levels comprise a first bias level, second bias level, third bias level, and fourth bias level. The bias levels provide power to the elements and modules and are capacitively coupled to circuit common to reduce high frequency noise generated by circuit devices such as DC-DC converters, mixers, and oscillators. These bias levels may be the same or may have differing values. The high frequency noise can cause false triggering in digital devices when the peak amplitude exceeds a digital logic threshold thereby causing the digital device to erroneously change states. Bypassing the high frequency noise from the elements and modules to circuit common thus significantly reduces false triggering in digital devices. A large bypass capacitor represents smaller impedance to the high frequency noise thus, for maximal bypassing, a large capacitance is desirable. However, the large capacitor takes longer to charge and the charge time may not meet a specified settle time as defined in a wireless standard.

The settle time specification usually mandates a small capacitor with a short charge time. The circuit designer is faced, therefore, with a tradeoff between mutually exclusive design goals. Inventive bias filtering module 120, by virtue of the voltage dependent filter function, meets the specified settle time while also providing a capacitance level necessary to performing the improved bypassing function that may be obtained with larger capacitance values. As shown in FIG. 3, bias filtering module 120 is coupled to provide a plurality of bias levels from at least one of the RF output module 112, the up-conversion module 110, the D/A converter module 108 and the processing module 104. Bias filtering module 120 comprises at least one MOS capacitor coupled between the plurality of bias levels and circuit common.

Logic circuitry 124 is coupled to provide power up and power down commands to at least a portion of modules in transmitter 100 to reduce the power consumed thereby increasing battery life. Logic circuitry 124 may be formed as a programmable logic device in one embodiment of the invention. It may, more generally, be made to include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital).

Figure 4:
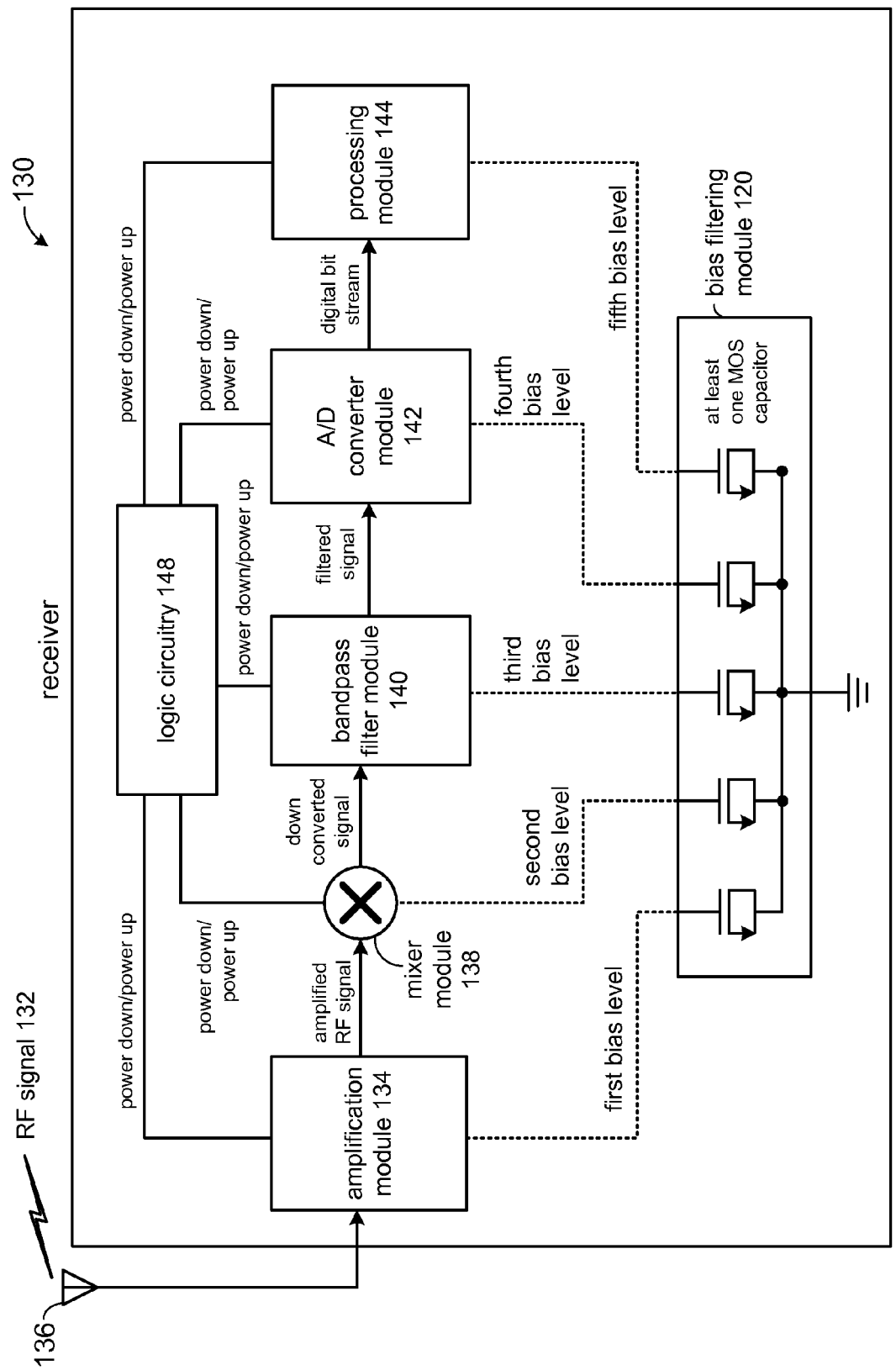
FIG. 4 is a schematic block diagram of a wireless receiver.

FIG. 4 is a schematic block diagram of a receiver, shown generally at 130, including bias filtering module 120. An RF signal 132 is received by an amplification module 134, via a receiving antenna 136. The RF signal 132 is amplified by amplification module 134 to produce an amplified RF signal to mixer module 138 where the amplified RF signal is mixed with a local oscillation signal to down-convert the amplified RF signal. The mixer module may down convert the amplified RF signal in one or more intermediate frequency (I/F) stages or may directly convert the amplified RF signal to baseband frequency. The down-converted signal is then produced to bandpass filter module 140 to attenuate unwanted out of band signals. The filtered signal is provided by bandpass filter module 140 to analog-to-digital (A/D) converter 142 which converts the analog signal from the analog domain to the digital domain. A digital bit stream is produced by the A/D converter and is provided to processing module 144. Processing module 144 processes the digital bit steam to retrieve data contained therein.

Logic circuitry 148 is coupled to provide power up and power down commands to at least a portion of modules in receiver 130 to reduce the power consumed thereby increasing battery life. Logic circuitry 148 may be formed as a programmable logic device in one embodiment of the invention. It may, more generally, be made to include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital). Each module, namely the amplification module 134, the mixer module 138, the bandpass filter module 140, the A/D converter module 142, and the processing module 144, in the embodiment of FIG. 4, requires biasing for proper operation. Bias lines may couple unwanted signals (noise) to the modules unless bias lines are filtered by bypass capacitors to remove the noise.

In the present embodiment of the invention, bias filtering module 120 provides the bypass function for the noise. As shown in FIG. 4, bias filtering module 120 is coupled between a first, a second, a third, a fourth and a fifth bias level and circuit common. Bias filtering module 120 is formed to reach a first settlement state for each bias level within a specified settle time required by the wireless standard. Bias filtering module 120 is further formed to charge to a second settlement state for each bias level by virtue of a voltage dependent filter function that serves to increase the effective capacitance (charge capacity) as the voltage potential of the bias lines increase to a final level. The increased capacitance has lower impedance to high frequency noise thereby by bypassing more high frequency noise to circuit common.

Figure 5:
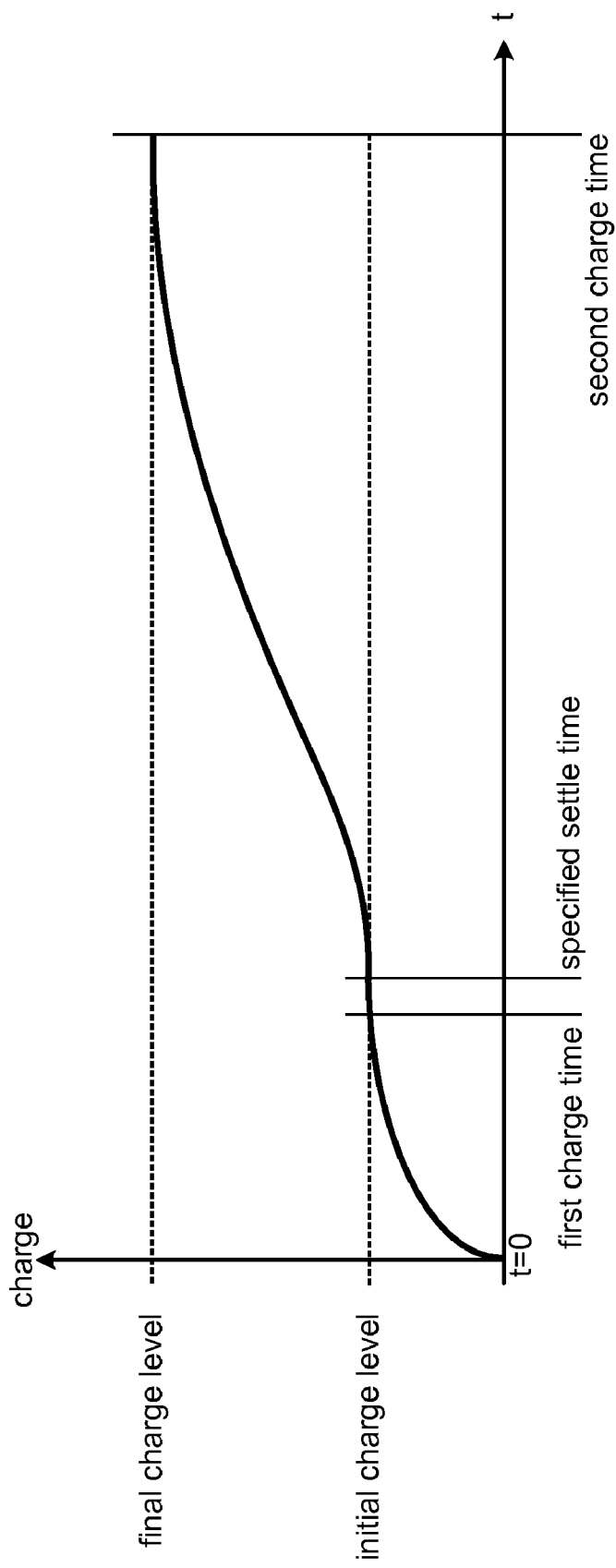
FIG. 5 is a diagram illustrating a two state charge function of a bias filtering module.

FIG. 5 is a diagram illustrating a bias filtering module formed according to one embodiment of the present invention to include two charge levels. Additional charge levels may readily be achieved according to what embodiment of the present invention is implemented. As can be seen in the diagram, at some time preceding t=0, a charge level on a bias line connected to the bias filtering module is approximately zero. This situation is typically found in devices that are powered down during inactive periods to save power. For example, in a wireless transceiver transmitting voice or data it is advantageous to power down the unused receiver elements to conserve battery power. Continuing with the discussion of FIG. 5, at time t=0 the bias filtering module begins to charge in response to a trigger event such as the arrival of a data preamble or a power-up command from a power controller. The bias filtering module will charge to an initial charge level in a first charge time that is less than or equal to a specified settle time as defined by a specification in a wireless or other standard or design goal. In some networks, for example, a settle time of 10 micro-seconds is required starting at the arrival of the preamble and ending as the circuit or device reaches steady state.

After achieving the initial charge level within the required or specified settle time, the bias filtering module will charge to a final charge level in a second charge time that is approximately three times longer that the first charge time in one embodiment of the invention. The initial charge level and final charge level are a function of a first capacitance value and a second capacitance value of the bias filtering module utilizing an MOS capacitor. The first capacitance value is selected to meet the specified settle time while the second capacitance value is selected to a meet a bias line filtering requirement.

Figure 6:
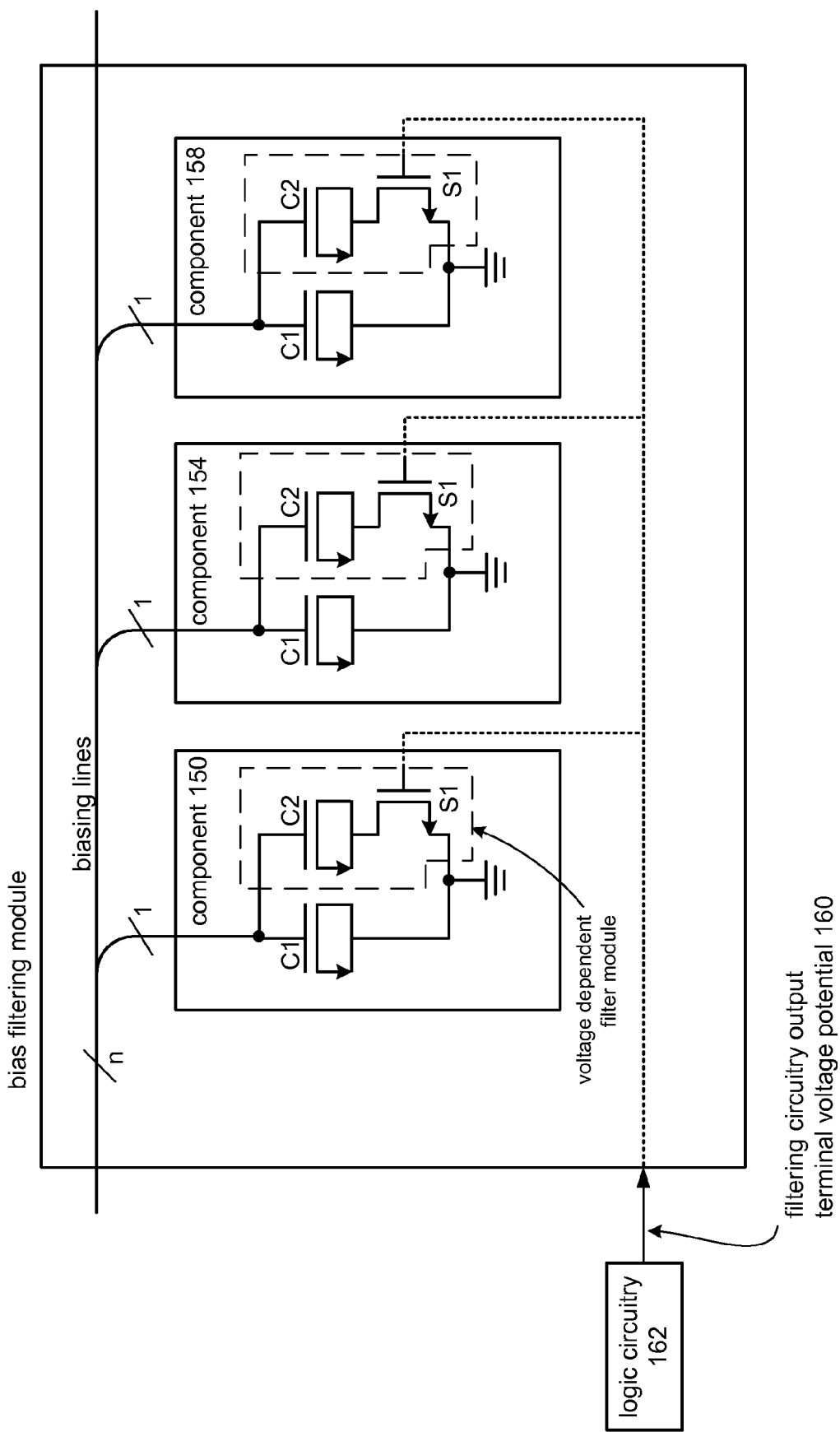
FIG. 6 is a schematic block diagram illustrating a bias filtering module formed according to one embodiment of the present invention.

FIG. 6 is a functional schematic block diagram illustrating a bias filtering module formed according to an alternate embodiment of the present invention. The bias filtering module, comprising a plurality of components, namely components 150, 154, and 158, each includes at least one MOSFET configured as a capacitor, and is coupled to provide a plurality of biasing levels for a plurality of biasing lines within a wireless device. As shown in FIG. 6, each of the at least one MOSFET configured as a capacitor (MOS capacitor) is coupled between at least one bias line and circuit common. MOS capacitors C1 and C2 and switch S1 are shown as separate devices to simplify the discussion. In one embodiment of the invention, capacitors C1 and C2 may be formed as one voltage dependent device, however, on an integrated circuit. In such a configuration, switch S1 is not present as the increase in voltage across the voltage dependent device, coupled between a bias line and circuit common would raise the charge capacity of the component 150, 154 or 158. When the biasing lines are raised to a first bias level, MOS capacitor C1 will charge up to an initial charge level within a specified settle time defined by a wireless standard.

Referring again to the alternate embodiment described in FIG. 6, as the biasing line level continues to rise it will exceed the initial charge level at which time MOS capacitor C2 will begin charging by virtue of MOSFET switch S1 becoming operational due to the filtering circuitry output voltage potential 160 coupled to the gate of S1 and provided by logic circuitry 162, thereby completing a charge path to circuit common. Logic circuitry 162 includes state logic to generate the filtering circuitry output terminal voltage potential 160 to close switch S1 once C1 has reached the first charge level or, alternatively once the specified settle time has been reached. Ordinarily, it is preferable to combine the capacitors C1 and C2 and to utilize a voltage dependent MOSFET capacitor whose charge level is a function of the voltage across its terminals. The alternate embodiment of FIG. 6, however, is useful for certain applications. For one example, a circuit may operate under different power modes of operation. In a first power mode, fast settle times are to be satisfied as components and circuits are frequently powered down and back up during operational modes (e.g., receive mode versus transmit mode). In a different power mode, however, a device may remain powered independent of operational mode (receive or transmit). For example, if the device is receiving power from a power supply rather than a battery, it may keep all circuits fully powered. In a power mode in which circuit components are not being cycled, the logic circuitry in FIG. 6 would switch in the additional capacitance of capacitor C2 to provide additional and improved filtering. Components 154 and 158 operate similarly and will not be discussed to avoid needless repetition. The bias filtering module shown in FIG. 6 may readily be used as the bias filtering module 120 of FIGS. 3 and 4 and alternate embodiments of the invention.

Figure 7:
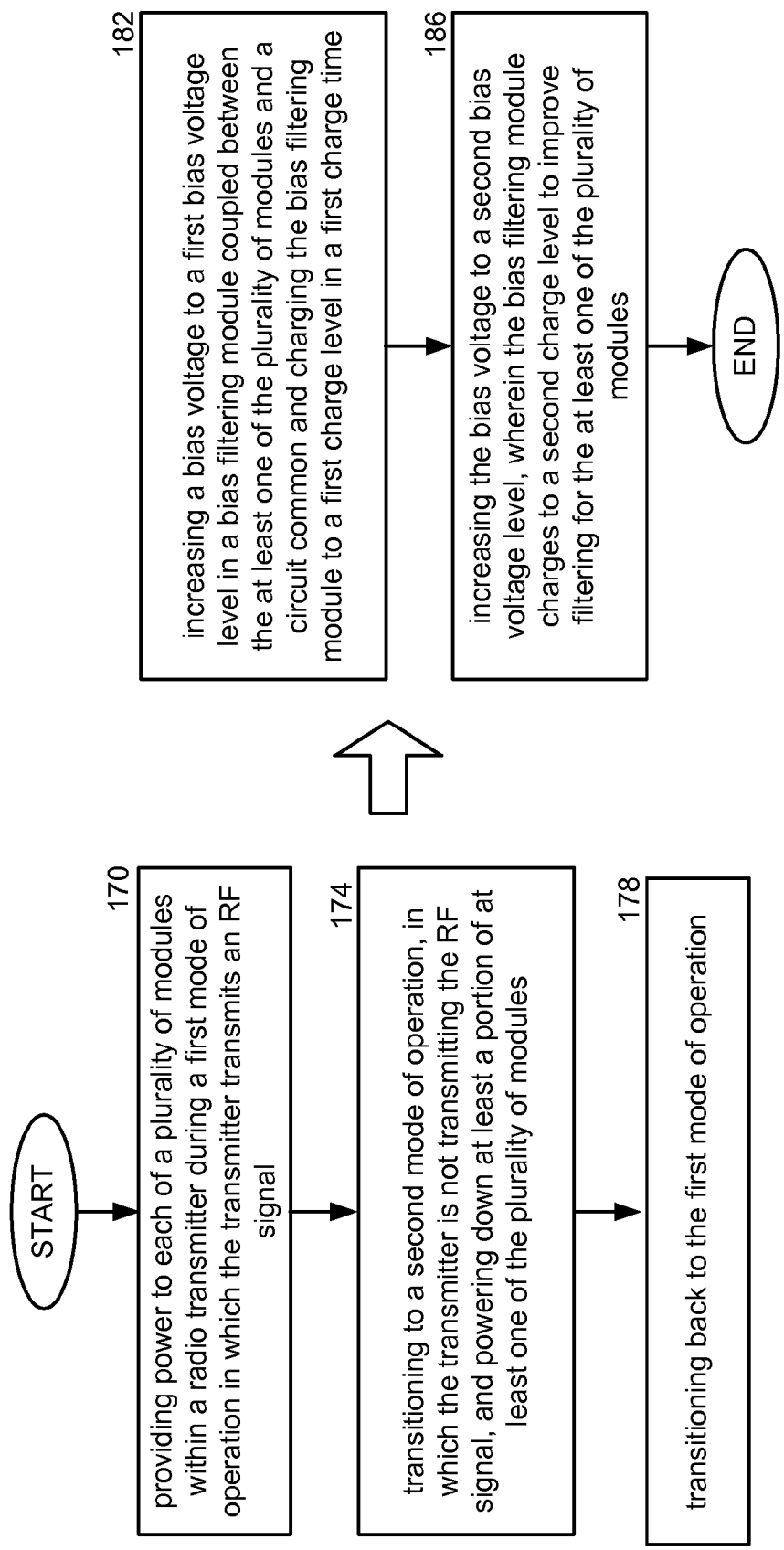
FIG. 7 is a flow chart of a method for providing power and for filtering a module within a radio transmitter.

FIG. 7 is a flow chart of a method for providing power and for filtering a module within a radio transmitter. During a first mode of operation when the transmitter is transmitting, power is provided to a plurality of modules within the radio transmitter (step 170). The transmitter transitions to a second mode of operation when the transmitter ceases transmission. In this second mode of operation power may be reduced to at least a portion of at least one module of a plurality of modules (step 174) within the radio transmitter to conserve power thereby increasing battery life. The decision to power down the at least one module can be based on a number of factors such as the time remaining before an allocated time slot begins. The power down commands may be issued responsive to instructions issued from a hardware or software device formed to provide a power control function. For example, the power control function may be formed as code executed with a microprocessor or microcontroller or coded in a programmable logic device. The radio transmitter will transition back to the first mode of operation (step 178) in response to a trigger event indicating the radio transmitter will soon begin a transmission. At this time a bias voltage is increased to a first bias voltage level in a bias filtering module coupled between the at least one module and a circuit common. The bias filtering module will charge to a first charge level in a first charge time (step 182). As the bias voltage continues to increase to a second bias voltage level, the bias filtering module will charge to a second charge level (step 186). The second charge level improves filtering for the at least one module by bypassing bias line noise to circuit common.

Figure 8:
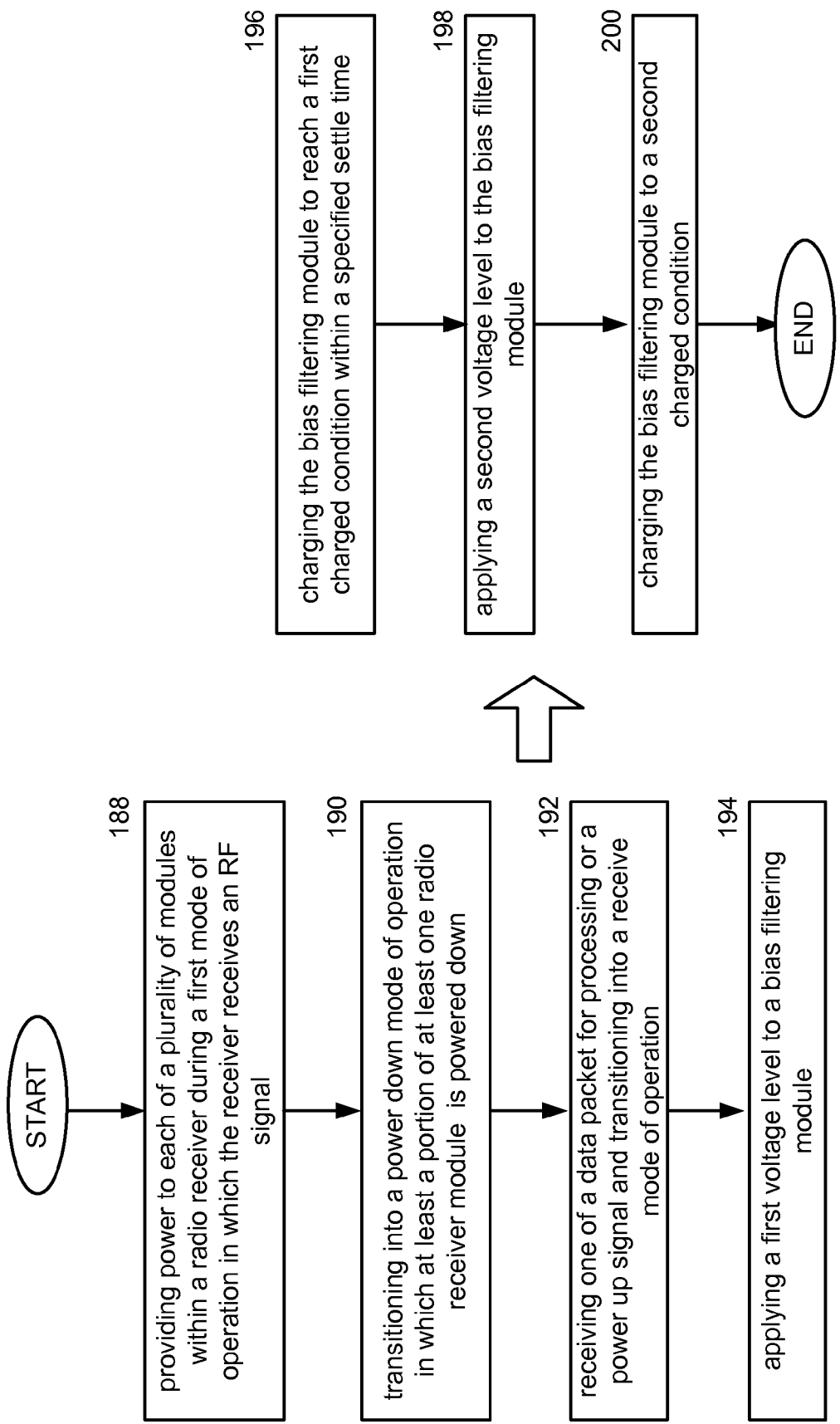
FIG. 8 is a flow chart of a method of filtering bias lines within a radio receiver.

FIG. 8 is a flow chart of a method of filtering bias lines within a radio receiver. During a first mode of operation when the receiver is receiving an RF signal, power is provided to a plurality of modules within the receiver (step 188). At the conclusion of the receive cycle, the receiver transitions into a power down mode of operation in which at least a portion of at least one radio receiver module is powered down (step 190) in order to conserve power. The decision to power down the at least one radio receiver element can be based on a number of factors such as the time remaining before an allocated time slot begins. Power down commands may be issued responsive to instructions received from a hardware or software device formed to provide a power control function. For example, the power control function may be formed as code executed with a microprocessor or microcontroller or coded in a programmable logic device. The receiver transitions into a receive mode of operation in response to a trigger event such as a power up signal or reception of one of a data packet (voice or data) for processing (step 192). At this time, a first voltage level is applied to a bias filtering module (step 194) in response to the power up signal or the received data packet. The bias filtering module, coupled between the plurality of receiver modules and circuit common, charges to a first charge condition within a specified settle time (step 196) defined by the wireless standard. After the bias filtering modules charges to the first charge condition, a second voltage level is applied to the bias filtering module (step 198) wherein the bias filtering module charges to a second charge condition (step 200) where the second charge condition meets a noise bypass filtering function.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A receiver, comprising:
   an amplification module coupled to receive a radio frequency (RF) signal to produce an amplified RF signal;
   a mixer module that produces a down converted signal based on the amplified RF signal;
   a filter module that produces a filtered signal based on the down converted signal;
   an analog-to-digital (A/D) converter module that produces a digital bit stream based on the filtered signal;
   a processing module coupled to receive and process the digital bit stream;
   logic circuitry coupled to power down and then power up at least a portion of one of the amplification module, the mixer module, the filter module, the A/D converter module, and the processing module; and
   a bias filtering module coupled to at least one of the amplification module, the mixer module, the filter module, the A/D converter module and the processing module to provide therefor one of a plurality of filtered bias levels, wherein the bias filtering module provides filtering for an initial bias level, relative to a trigger event, for enabling fast power up and further provides a final filtered bias level with improved filtering.

2. The receiver of claim 1 wherein the bias filtering module provides the final filtered bias level based on a control signal that corresponds to power up operations of the logic circuitry.

3. The receiver of claim 1 wherein the bias filtering module includes a plurality of selectable components, each of the plurality of selectable components coupled to provide corresponding final filtered bias levels.

4. The receiver of claim 1 wherein the bias filtering module comprises at least one voltage dependent filter module having an initial capacitance value with an associated initial charge level and a final capacitance value with an associated final charge level and wherein the initial capacitance value is one that is designed to satisfy a desired settle time.

5. The receiver of claim 4 wherein the final capacitance value of the voltage dependent filter module has a charge time that exceeds the desired settle time.

6. The receiver of claim 5 wherein the final capacitance value of the voltage dependent filter module is one that satisfies a desired filtering function.

7. The receiver of claim 4 wherein the desired settle time is equal to ten micro-seconds and the initial capacitance value that provides the initial charge level is less than 30 pico-farads.

8. The receiver of claim 4 wherein the final settle time is greater than 10 micro-seconds and the final capacitance value is greater than or equal to 30 pico-farads.

9. The receiver of claim 4 wherein the final capacitance value is at least two times greater than the initial capacitance value.

10. The receiver of claim 4 wherein each of the plurality of components are formed to have at least two charge times wherein a first charge time is less than the desired settle time and wherein a second charge time exceeds the desired settle time.

11. A transceiver, comprising:
    a processing module coupled to receive and process an ingoing digital bit stream and to produce an outgoing digital bit stream for transmission;
    radio front end circuitry for processing wireless communication signals, the radio front end circuitry coupled to the processing module to receive the outgoing digital bit stream for transmission and coupled to produce an ingoing digital bit stream based on received RF signals, the radio front end circuitry including a converter module for converting between analog and digital signal forms, a mixing module, and an RF output module;
    logic circuitry coupled to power down at least a portion of at least one of the processing module and the radio front end circuitry and coupled to power up any module powered down to process the wireless communication signals; and
    a bias filtering module operably coupled to at least one of the processing module, the converter module, the mixing module, and the RF output module to provide therefor an initial filtered bias level within a desired settle time, relative to a trigger event, for enabling fast power up and further provides a final filtered bias level having improved filtering.

12. The transceiver of claim 11 wherein the desired settle time is less than thirty microseconds.

13. The transceiver of claim 11 wherein the bias filtering module comprises at least one MOS capacitor coupled between a bias signal and circuit common.

14. The transceiver of claim 13 wherein first and second MOS capacitors provide a first filtering function for a first bias level and a second bias level, respectively.

15. A method for providing power and for filtering a module within a radio transceiver, comprising:
    providing power to a plurality of modules within the radio transceiver during a first mode of operation;
    transitioning to a second mode of operation and powering down at least a portion of at least one of the plurality of modules;

transitioning to the first mode of operation and providing a first filtered bias voltage level to at least one of the plurality of modules that was powered down during the second mode of operation within a desired settle time during the transitioning to the first mode of operation; and subsequently providing a second filtered bias voltage level while in the first mode of operation to improve bias line filtering.

16. The method of claim 15 wherein the first mode of operation is a mode in which the transceiver processes an ingoing RF signal, the method further including providing power to at least one of an amplification module, a mixing module, a filtering module and a processing module.

17. The method of claim 16 wherein the second mode of operation is not processing an ingoing RF signal.

18. The method of claim 15 wherein the first mode of operation is a mode in which the transceiver processes an outgoing RF signal, the method further including providing power to at least one of an amplification module, a mixing module, a filtering module, a processing module and an RF output module.

19. The method of claim 18 wherein the second mode of operation is a mode in which the transceiver is not processing an outgoing RF signal.

* * * * *